June 2, 1964    R. McGIRR    3,135,636
IGNITION COMPOSITION CONTAINING AN ALKALI METAL SALT
OF DINITROBENZFUROXAN AND A LACQUER BINDER
Filed Jan. 2, 1962

*INVENTOR.*
Robert McGirr
BY Donald C. Studley 3,135,636
IGNITION COMPOSITION CONTAINING AN ALKALI METAL SALT OF DINITROBENZ-FUROXAN AND A LACQUER BINDER
Robert McGirr, Orwigsburg, Pa., assignor to Atlas Chemical Industries, Inc., Wilmington, Del., a corporation of Delaware
Filed Jan. 2, 1962, Ser. No. 163,668
4 Claims. (Cl. 149—23)

The present invention relates to improved ignition compositions adapted to use in detonators and squibs. The present invention also relates to detonators and squibs containing the improved ignition compositions. The ignition compositions of the present invention are particularly useful in the production of electrically operated detonators or squibs where it is desired that the residue remaining after the ignition composition is fired have a high electrical resistance.

The term "ignition composition" as used herein is defined to include charges that are ignited by means of a spark, flame or hot wire. Ignition compositions located in firing position to a spark, flame or hot wire may be in the form of loose powder, compacted powder or shaped in a solid form, for example, as in the case of button charges or match-head compositions.

The term "initiator" as used herein is defined to include detonators, such as those used to initiate explosive charges, and squibs, such as those used to produce flame or a mechanical action by means of heat or gas pressure.

It is frequently desirable to have electrically operated initiators which have a high electrical resistance after firing in order not to deplete the supplying electrical source by continued electrical flow through the firing circuit after the initiator is fired. This is of particular importance where the electrical source is of a very limited capacity and may be required to supply energy to additional electrical circuits after the initiator has been fired.

In accord with the present invention, an ignition composition containing an alkali metal salt of dinitrobenzfuroxan is provided. Generally the ignition compositions of the present invention are comprised of an alkali metal salt of dinitrobenzfuroxan or an alkali metal salt of dinitrobenzfuroxan and an inert, non-conducting diluent. Preferably mixtures of the invention contain at least about 20% by weight of the alkali metal salt of dinitrobenzfuroxan. Mixtures containing at least about 50% of an alkali metal salt dinitrobenzfuroxan have been found to have a wide range of use in initiator ignition compositions. The inert, non-conducting diluent utilized in mixture with an alkali metal salt of dinitrobenzfuroxan may, for example, be diatomaceous earth, calcium silicate, bauxite, glass or clay, for example, attapulgite. Preferably the diluent materials are in a finely divided form to facilitate dispersion through the dinitrobenzfuroxan alkali metal salt material. Inert, non-conductive materials having a size of minus 325 mesh U.S.S. screen are aptly suited to use as diluents.

After firing the residual residue, or ash, of the present ignition compositions have a high electrical resistance. If 0.005 gram of one of the present ignition compositions, for example, potassium dinitrobenzfuroxan, is placed about a bridge wire of nickel-chromium alloy .001 inch in diameter and 0.062 inch in length and fired by applying electrical current to the bridge wire, the residue remaining after the bridge wire has ruptured and the ignition mixture has fired has an electrical resistance of at least 10,000 ohms measured at room temperature. Generally the electrical resistance of the residual of the present ignition compositions ranges from 20,000 ohms to infinity. Similar tests carried out using similar amounts of prior art ignition compositions frequently yield a residue having an electrical resistance of less thatn 100 ohms.

The present invention provides initiators containing an alkali metal salt of dinitrobenzfuroxan. Initiators in accord with the present invention include an alkali metal salt of dinitrobenzfuroxan as an ignition composition or as an ignition composition and as an additional charge such as a flash, priming or base charge. Generally, it is preferred that the charge immediately adjacent the ignition composition be comprised of an alkali salt of dinitrobenzfuroxan and that it principally contain an alkali metal salt of dinitrobenzfuroxan. Such an arrangement minimizes the deposit of electrically conductive residues from other charges in the area around the electrodes. Although in some types of initiators ignition compositions priming or base charges composed entirely of an alkali metal salt of dinitrobenzfuroxan are entirely satisfactory, the explosive output of the alkali metal salts of dinitrobenzfuroxan is sufficiently high that undesired damage to the initiator shell wall may sometimes occur. It is therefore sometimes preferred to dilute the alkali metal salts of dinitrobenzfuroxan with an inert material if it is to be utilized in an initiator susceptible to shell wall damage. Mixtures of an alkali metal salt of dinitrobenzfuroxan and inert materials also facilitate production of miniature initiators in which small but highly consistent ignition priming or base charges are required by easing the burden of measuring ultra-small amounts of highly sensitive explosive material. Ignition or base charges containing inert materials preferably contain at least 50% by weight of the alkali metal salt of dinitrobenzfuroxan material to insure ignitability of the composition.

The compositions of the present invention may be shaped into any desired form, for example, buttons, drops, matches or buttered charges by mixing a suitable amount of a lacquer binding material, for example, nitrocellulose, nitrostarch, or polyester resin compositions with the dry composition, molding the mixture and allowing the binding material to harden. Generally between about 3 and about 10% by weight of a lacquer binding material provides a mixture which is aptly suited to forming. If desired, mixtures of the ignition compositions of the present invention and binding material may be utilized as dipping compositions by utilizing the above binding agents with a solvent, for example, toluene. The assembly to which the ignition composition is to be applied is merely dipped in the dipping composition and the adhering ignition mixture allowed to harden.

The ignition compositions of the present invention which contain a high percent by weight of an alkali metal salt of dinitrobenzfuroxan also provide a highly sensitive ignition means. For example, ignition compositions containing at least about 75% by weight of an alkali metal salt of dinitrobenzfuroxan in contact with a bridge wire having a length of 0.02 inch and an electrical resistance of 1.8 ohms are susceptible to ignition by passage of 0.5 ampere through the wire.

Alkali metal salts of dinitrobenzfuroxan may be produced by reacting ortho-nitroaniline and alkaline sodium hypochlorite to produce benzfuroxan. The benzfuroxan is then dissolved in 6 parts by weight of 96% sulfuric acid and nitrated at between 5 and 20° C. by adding a 4 to 1 sulfuric-nitric acid mixture. The salt may be prepared by neutralizing the formed dinitrobenzfuroxan with the bicarbonate of an alkali metal followed by recrystallation of the formed salt product from hot water. The alkali metal salts of dinitrobenzfuroxan are recovered in the form of small plates. The preparation of potassium dinitrobenzfuroxan is described in Section 1 of Ordnance Corps pamphlet ORDP 20–177, "Properties of Explosives of Military Interest," unclassified, Office of the Chief of Ordnance, May 1960. The sodium salt may be prepared in a similar manner, except instead of potassium bicarbonate to neutralize the dinitrobenzfuroxan, sodium bicarbonate is used. Because of the ease of preparation from low cost and readily available bicarbonates, the potassium and sodium salts of dinitrobenzfuroxan are aptly suited to use in the present invention.

The present invention may be more readily understood from a consideration of the accompanying drawings wherein.

Like numerals refer to like components in each of the three embodiments.

Figure 1:
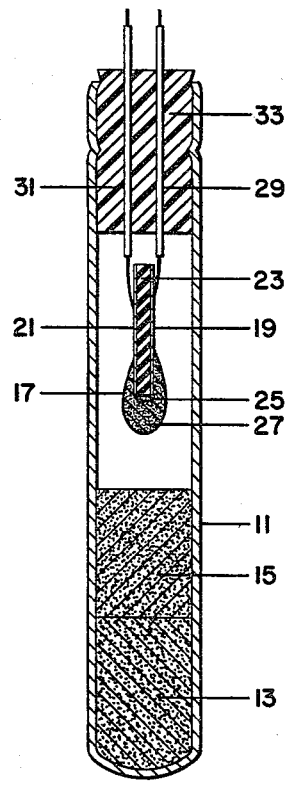
FIGURE 1 is a diagrammatic longitudinal section of an electric detonator containing an ignition composition of the present invention in the form of a match composition.

Referring now to FIGURE 1, an electric detonator having a cylindrical metal shell 11, containing a suitable charge of detonating exposive 13, for example, pentaerythritol-tetranitrate, pressed in the bottom. Directly above the base charge 13 is a priming charge 15 of potassium dinitrobenzfuroxan. If a high electrical resistance after firing of the match is not required, other materials, for example, lead mononitroresorcinate, lead azide or lead styphnate, may be utilized as the priming charge. Spacedly arranged above the priming charge but within igniting distance therewith is match assembly 17. Match assembly 17 includes metal tabs 19 and 21, insulation 23, a bridge wire of high electric resistance and an ignition composition in the form of a match head 27. Match head 27 is comprised of an alkali metal salt of dinitrobenzfuroxan bound together with the residue from a cellulose nitrate lacquer and contains about 75% by weight of an alkali metal salt of dinitrobenzfuroxan. The match head is formed by suspending the ignition composition in a lacquer, for example, cellulose nitrate lacquer, and dipping the bridge wire end of the match structure in the suspension; upon removal, a body of the suspension clings to and completely covers the bridge wire and on drying leaves a match head having a bridge wire embedded therein. If desired, the detonator shown in FIGURE 1 may be modified to perform a delay function by placing a delay fuse train between the match head and the priming charge. Less explosive force in the match head may be desired in order to minimize damage to the shell wall and possible malfunction of the detonator prior to detonation of the base charge. In such case, the ignition composition may comprise a mixture containing at least 50% by weight of an alkali metal salt of dinitrobenzfuroxan diluted with an inert material such as finely divided diatomaceous earth, calcium silicate, clay or glass. Metal plates 19 and 21 are electrically connected to leg wires 29 and 31 which extend through sealing plug 33 and beyond the confines of shell 11.

A series of 100 electrical detonators similar to the detoator shown in FIGURE 1 were assembled utilizing a base charge of 0.65 gram of pentaerythritoltetranitrate, a priming charge of 0.13 gram of mannitol hexanitrate. This series of detonators had a 0.062 inch long, .0015 inch diameter nickel-chromium bridge wire which had an electrical resistance of about 1.2 ohms, and a match head comprised of potassium dinitrobenzfuroxan with about 5% by weight of nitrocellulose lacquer as binding agent. The series of detonators were tested by applying measured amounts of electrical energy to the leg wires. The detonators were found to be sensitive to about 0.36 ampere.

Figure 2:
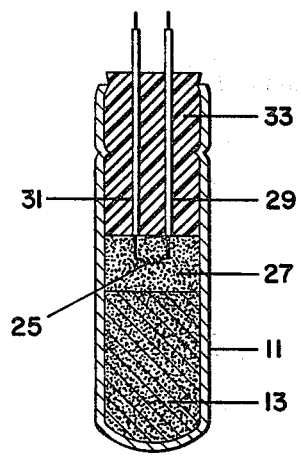
FIGURE 2 is a diagrammatic longitudinal section of an electric detonator containing an ignition composition of the present invention in the form of a pressed charge.

FIGURE 2 is a diagrammatic cross-section showing a detonator having a metal shell 11 and containing a detonating base charge 13, of an alkali metal salt of dinitrobenzfuroxan, for example, sodium dinitrobenzfuroxan. Above base charge 13 and in igniting position therewith is a loosely packed ignition charge 27 comprised of particulate alkali metal salt of dinitrobenzfuroxan, for example, sodium dinitrobenzfuroxan. The ignition charge 27 surrounds and is in position to be ignited by bridge wire 25 which is in turn electrically connected to leg wires 29 and 31. Leg wires 29 and 31 extend through sealing plug 33 and beyond the confines of shell 11. If less sensitivity or less explosive force is desired a mixture containing at least 50% by weight of an alkali metal salt of dinitrobenzfuroxan diluted with a finely divided inert material such as diatomaceous earth, calcium silicate, clay or powdered glass, may be utilized.

Figure 3:
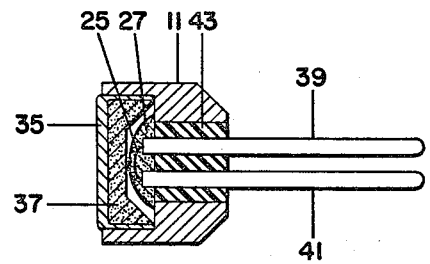
FIGURE 3 is a diagrammatic longitudinal section of a squib containing an ignition composition of the present invention both in the form of a button charge and as a gas producing squib base charge.

FIGURE 3 shows an electrical squib having a metal shell 11, a cap portion 35 inserted into shell 11, a squib base charge 37 positioned within shell 11 and in igniting position to button ignition charge 27. A bridge wire of high electrical resistance 25 is embedded in charge 27 and is electrically connected to electrodes 39 and 41 which extend through shell 11 but are insulated therefrom and from each other by insulating material 43 which may, for example, be glass or plastic. The squib base charge 37 is comprised of a mixture containing 50% by weight of an alkali metal salt of dinitrobenzfuroxan and 50% by weight of diatomaceous earth. Squib ignition charge 27 is comprised of a dried paste of an alkali metal salt of dinitrobenzfuroxan, diatomaceous earth, and nitrocellulose lacquer and contains about 50% by weight of the alkali metal salt of dinitrobenzfuroxan. The ignition charge is formed by forming a thick suspension of the ignition composition in a suitable lacquer binding agent, for example, cellulose nitrate lacquer having a viscosity of between about 60 and about 80 seconds, and dropping a drop of the suspension on the bridge wire. The composition hardens to form a hard drop or button covering the bridge wire.

A series of 260 squibs similar to that shown in FIGURE 3 were assembled having a base charge of 50 parts by weight of potassium dinitrobenzfuroxan and 50 parts by weight of diatomaceous earth. The squibs were provided with an ignition charge made by mixing 50 parts by weight of potassium dinitrobenzfuroxan with 50 parts by weight of diatomaceous earth and about 5 parts by weight of nitrocellulose lacquer binding agent having a viscosity of between about 60 and about 80 seconds. A button ignition charge was formed about the bridge wires and the composition allowed to harden. The bridge wires were 0.0008 inch in diameter, 0.062 inch in length and had an electrical resistance of 4.5 ohms. The squibs were fired by applying a sufficient amount of electrical energy to fuse the bridge wire and ignite the ignition charge. The squibs were found to be sensitive to about 0.2 ampere, the most sensitive being susceptible to 0.1 ampere, the most insensitive being susceptible to 0.3 ampere. After firing the residual electrical resistance was determined by applying a 50 volt electrical source to one of the electrodes and measuring the resistance of the circuit formed by that electrode, the residue from the ignition composition and base charge which is scattered about the inside of the squib, and the other electrode. The residual electrical resistance between the electrodes was found to average 666,000 ohms with a low test of 22,000 ohms.

The following table shows the results of a series of residual electrical resistance tests conducted utilizing squibs similar to those shown in FIGURE 3 and described above, wherein the residual electrical resistance was measured between one electrode and the shell wall. The squibs were fired and the residual electrical resistance between one electrode and the shell wall was determined by applying a 10 volt electrical source to one of the electrodes and measuring the minimum resistance of the circuit formed by the electrode, the residual residue and the metal squib shell.

Table

| Test No. | Squib Base Charge (Percent By Weight) | | Residual Electrical Resistance (In Megohms) |
|---|---|---|---|
| | Potassium Dinitrobenzfuroxan | Diatomaceous Earth | |
| 1 | 50 | 50 | 1.11 |
| 2 | 50 | 50 | 0.5 |
| 3 | 50 | 50 | 0.769 |
| 4 | 50 | 50 | 1.25 |

What is claimed is:

1. An ignition composition containing an alkali metal salt of dinitrobenzfuroxan and a lacquer binding material, said binding material being present in an amount of not more than 10% by weight of the composition.

2. An ignition composition containing an alkali metal salt of dinitrobenzfuroxan and a lacquer binding material, said binding material being present in an amount between about 3% and about 10% by weight of the composition.

3. An ignition composition containing an alkali metal salt of dinitrobenzfuroxan and an inert, non-conducting diluent selected from the group consisting of diatomaceous earth, calcium silicate, bauxite, glass and clay.

4. The ignition composition of claim 3 wherein the alkali metal salt is present in an amount of at least 50% by weight and the inert diluent is diatomaceous earth.

References Cited in the file of this patent

UNITED STATES PATENTS

| 1,906,869 | Noddin | May 2, 1933 |
| 2,389,552 | Sanford | Nov. 20, 1945 |

FOREIGN PATENTS

| 158,540 | Great Britain | of 1922 |
| 177,744 | Great Britain | Apr. 6, 1922 |
| 56,520 | Sweden | Apr. 15, 1924 |

OTHER REFERENCES

Military Explosives, TM9–1910/TO 11A–1–34, Department of the Army and the Air Force, April 1955, p. 209.

Patterson and Capell, The Ring Index, Reinhold Pub. Corp., New York, New York (1940), p. 180.